Dec. 7, 1948.  E. C. MOSS  2,455,516
GAUGE FOR CHECKING THE CENTERLINE OF ELONGATE PARTS
Filed July 10, 1946  3 Sheets-Sheet 1
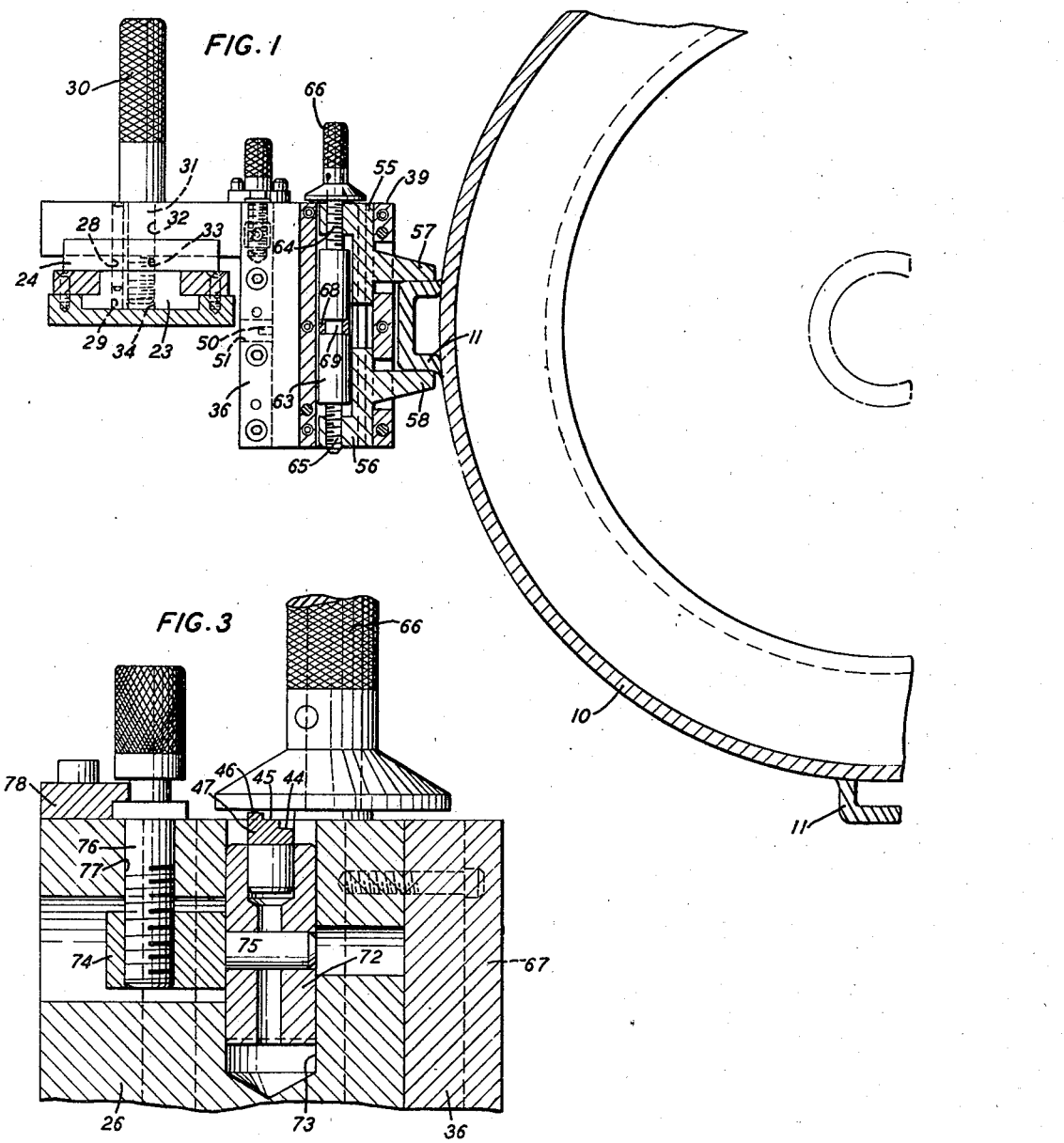
INVENTOR
E.C. MOSS
BY
W.C. Parnell
ATTORNEY

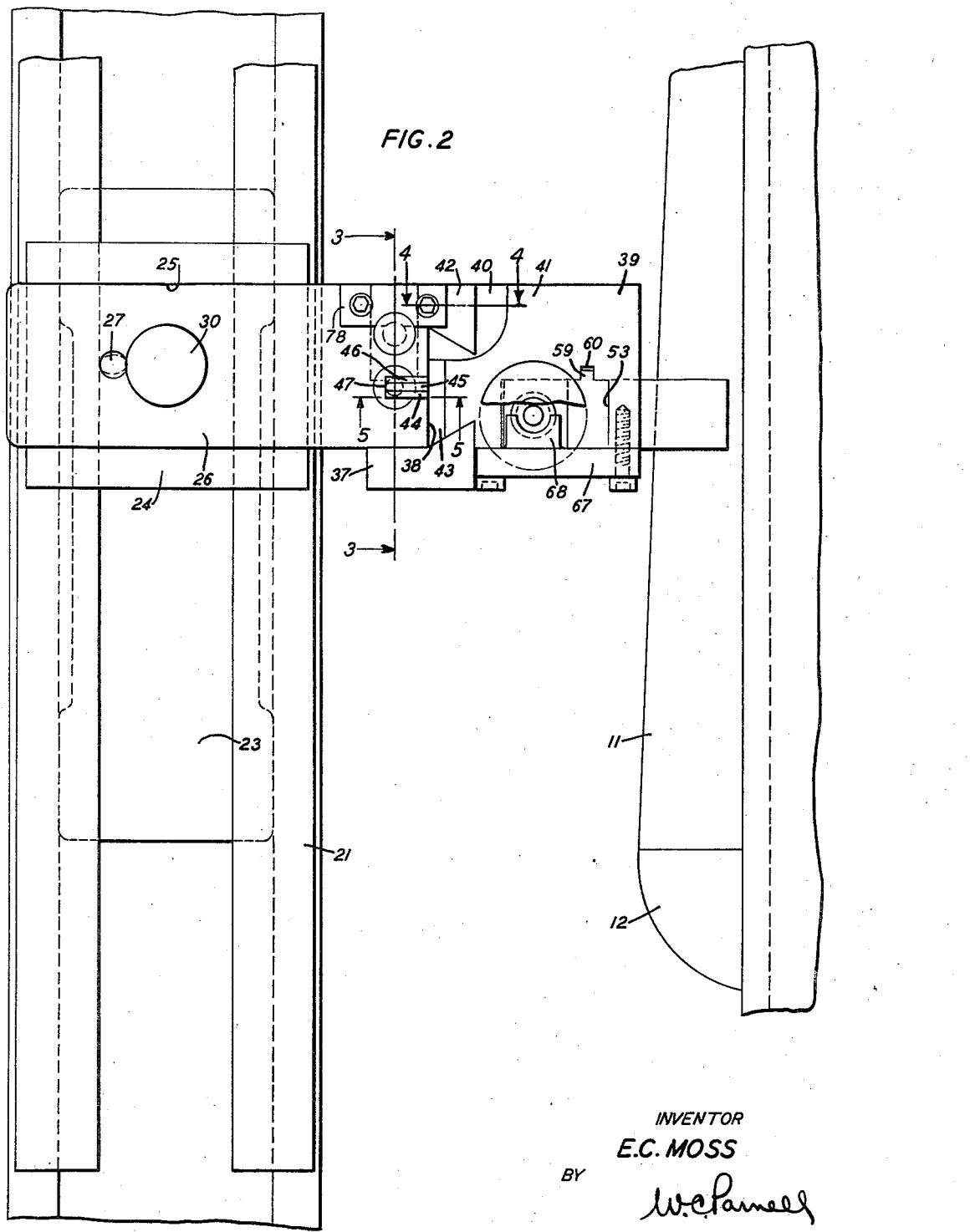

Dec. 7, 1948.  E. C. MOSS  2,455,516
GAUGE FOR CHECKING THE CENTERLINE OF ELONGATE PARTS
Filed July 10, 1946  3 Sheets-Sheet 3

INVENTOR
E.C. MOSS
BY
W.C. Parnell
ATTORNEY

Patented Dec. 7, 1948

2,455,516

UNITED STATES PATENT OFFICE 2,455,516

GAUGE FOR CHECKING THE CENTER LINE OF ELONGATE PARTS

Earl C. Moss, Westfield, N. J., assignor to Western Electric Company, Incorporated, New York, N. Y., a corporation of New York Application July 10, 1946, Serial No. 682,675

5 Claims. (Cl. 33—174)

This invention relates to gages and more particularly to gages for checking the centerlines of elongate parts, mounted on peripheries of cylindrical articles, with respect to the centerlines of the articles.

In the manufacture of various kinds of apparatus and equipment, it is necessary to check the alignment of related parts or structures to a high degree of accuracy. When these parts or structures are external guides of submarine devices or other contoured members which cannot be checked by the common forms of gaging apparatus, other gages capable of determining the accuracy of the mounting of such parts are required.

An object of the invention is to provide a gage which is simple in construction and highly efficient in operation for checking the alignment of elongate parts externally mounted on cylindrical structures with respect to the centerlines of such structures.

Broadly, the invention comprises a gage mounted for movement in a path parallel with the centerline of an article on the periphery of which an elongate part is mounted. Relatively movable jaws carried by a floating element are positioned to grip the part at any portion thereof throughout its length to cause relative movement of means to indicate whether or not the centerline of the part at any of the gaged portions is within predetermined limits of a given plane through the centerline of the article.

More specifically the jaws of the gage are operated by a common element in the form of a hand screw with right and left hand threads for their respective jaws to cause the jaws to move toward or away from each other simultaneously. The floating element carries gaging surfaces which cooperate with a gaging surface of an arm of the gage for an initial check to determine whether or not the centerline of one end of the part is within predetermined limits of the given plane or position. Another gaging feature includes a stepped element having gaging surfaces at three different positions associated with a gaging surface of the floating element. The gaging element is supported by the arm of the gage but is adjustable at the initial gaging position so that the intermediate gaging surface thereof will register with the adjacent gaging surface of the floating element, the other surfaces of the gaging element indicating the limits the centerline of the part may vary throughout its length from the initial position during subsequent gaging operations.

Other objects and advantages will be apparent from the following detailed description when considered in conjunction with the accompanying drawings, wherein Fig. 1 is a vertical sectional view of the gage shown in position to gage a part mounted on the outer periphery of a cylindrical article;

Fig. 2 is a fragmentary top plan view, at a larger scale, of the structure shown in Fig. 1;

Fig. 3 is an enlarged sectional view taken along the line 3—3 of Fig. 2.

Figure 4:
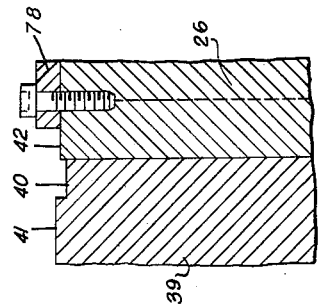
Fig. 4 is a fragmentary sectional view taken along the line 4—4 of Fig. 2.
Figure 5:
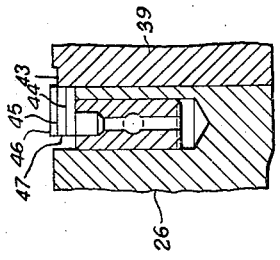
Fig. 5 is a fragmentary sectional view taken along the line 5—5 of Fig. 2.
Figure 6:
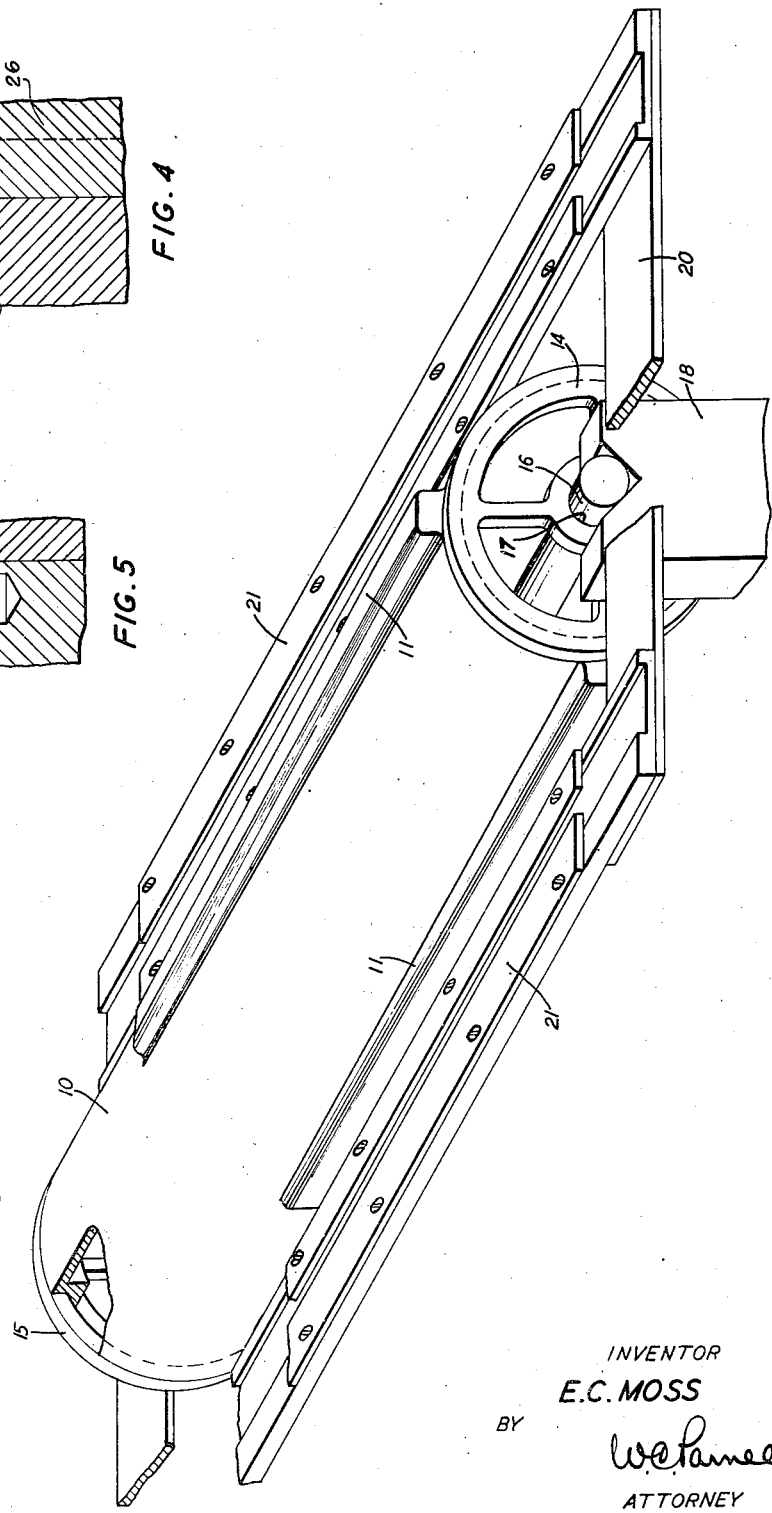
Fig. 6 is a perspestive view of the article, with elongate parts on its periphery, mounted in a position to be gaged.

In the present embodiment a cylindrical article 10 has equally spaced parts 11 mounted on its periphery by suitable means such as welding. The parts 11 are substantially U-shaped in cross-section and are formed of sheet metal. The leading ends of the parts 11 are closed by parts 12 which are also secured to their respective parts and to the article 10 by suitable means such as welding. The parts 11 and their associated parts 12 must be mounted within predetermined limits of given positions with respect to the centerline of the article. Furthermore, although small variations may be allowed in the width of each part, the centerline of each part must be maintained within given limits of its starting point at the leading end of each part. Furthermore, the leading end of each part must be within given limits of a known position with respect to the centerline of the article and it is from this position that successive gaging operations of each part are performed.

The article 10 has heads 14 and 15 mounted on its ends, the heads being supported by a shaft 16 extending through central openings 17 in each of the heads. The ends of the shaft 16 are supported in V-blocks 18, only one of which is shown in the drawing. The axis of the shaft 16 is identical with the centerline of the article. A table 20 surrounds the article 10 and is provided with parallel guides 21 at each side of the article. Suitable means (not shown) supports the table 20 so that the guides will lie in a common plane parallel with a plane extending through the centerline of the article. A slide 23 is receivable in either guide 21 for movement in given paths parallel with the centerline of the article. A plate 24 extending across the guide 21 is recessed at 25 to receive an arm 26. A pin 27 carried by the arm 26 extends through apertures 28 and 29 in the plate 24 and the slide 23 respectively to cooperate with a handle 30 in maintaining the arm at right angles to the slide. The handle has a reduced shank 31 extending through aligned apertures 32 and 33 of the arm 26 and plate 24 respectively, the lower end of the shank being threaded and receivable in a threaded aperture 34 of the slide 23 to secure the arm in a selected position on the guide when the handle is tightened.

The arm 26 has a portion 36 which extends downwardly and cooperates with a bracket 37 in forming a dovetail slot 38 for a corespondingly formed part of a floating element 39. An upper portion of the element 39 has gaging surfaces 40 and 41 which cooperate with a gaging surface 42 of the arm 26. Another gaging surface 43 of the floating element 39 cooperates with gaging surfaces 44, 45 and 46 of a gaging element 47.

The floating element 39 carries a pin 50 receivable in an aperture 51 of the vertical portion of the arm 26 to allow movement of the element 39 within any limits greater than those allowed for the variations in the centerlines of the parts with respect to the centerline of the article. The element 39 is cutaway at 53 to receive members 55 and 56 carrying jaws 57 and 58 respectively. Lugs 59 integral with both members 55 and 56 are positioned to ride in a vertical groove 60 in the element 39 to maintain movement of the jaws in aligned paths and to also maintain their gripping surfaces parallel at all times. An adjusting element 63 has portions 64 and 65 with left and right hand threads, respectively disposed in similarly threaded apertures in the members 55 and 56. Through the aid of a knurled member 66 mounted on the upper end of the element 63, the element 63 may be rotated in either direction to cause movement of the jaws 57 and 58 toward and away from each other. A cover plate 67, mounted upon the element 39 to close the cutaway portion 53, carries a yoke 68 which straddles a reduced central portion 69 of the member 63 to hold the member against axial movement.

The gaging surfaces 44, 45 and 46 are in the form of steps in the gaging element 47 which is carried by a piston-like member 72 movably disposed in an aperture 73 in the arm 26. An internally threaded member 74, connected to the member 72 by a shank 75 integral with the member 74, is moved upwardly or downwardly through the rotation of a threaded element 76. The element 76 is mounted in an aperture 77 of the arm 26 and is held against axial movement by a bracket 78.

Upon considering the operation of the gage, let it be assumed that the article 10 is mounted in a gaging position with one of its diametrically opposed parts 11 thereof disposed in gaging positions adjacent each of the guides 21 of the table 20. The gage may then be mounted on either guide 21 depending upon which part is to be gaged first. The operator then moves the slide with the gage to the leading end of the adjacent parts 11 near the part 12. During this movement, the jaws 57 and 58 are opened to allow for the free movement of the gage relative to the part. Furthermore, during movement of the gage, the element 39, with the jaws and associated structure, floats in its dovetail connection with the arm 26. When the gage has been disposed in the proper position for the initial gaging operation, the operator locks the slide 23 in the guide 21 with the member 31 and then rotates the knurled member 66 to close the jaws 57 and 58 on the leading end of the part 11. If the gage surfaces 40 and 41 are positioned respectively below and above the gaging surface 42, the centerline of the part at the leading end thereof is within predetermined limits of the given position with respect to the centerline of the article. At this time, while the jaws 57 and 58 are clamped on the leading end of the part the threaded element 76 is adjusted to position the gaging surface 45 of the gaging element 47 in a plane with the gaging surface 43. The purpose for this adjustment is to set the gage so that the operator may determine whether or not the centerline of the part at subsequent gaging positions throughout its length remains within given plus or minus (±) limits, indicated by the gaging surfaces 44 and 46 associated with the gaging surface 43, from the given position. The operator then loosens the jaws and the slide and moves the gage longitudinally of the guide to the next gaging position. Each time the operator performs gaging operations on the part, he merely tightens the jaws 57 and 58 on the part and observes the relationship of the gaging surface 43 with respect to the gaging surfaces 44, 45 and 46. If the gaging surface 43 falls between the gaging surfaces 44 and 46 that portion of the part is approved, that is, its centerline is within given limits of the selected position with respect to the centerline of the article.

If desired, like gages may be employed to simultaneously gage diametrically opposed ribs or parts 11 through the aid of the parallel guides 21. Furthermore, the gage may be readily removed from one guide and inserted in the other guide to check the diametrically opposed part 11. After the second part has been gaged, the article my be rotated on its shaft 16 to bring the other parts into position for gaging.

Although specific improvements of the invention have been shown and described, it will be understood that they are but illustrative and that various modifications may be made therein without departing from the scope and spirit of this invention as defined by the appended claims.

What is claimed is:

1. A gage for checking the centerline of an elongate part with respect to the centerline of a cylindrical article upon the periphery of which the part is mounted, the gage comprising an arm, means to support the arm for movement in a guided path parallel with the centerline of the article, the arm having a fixed position gaging surface, a floating element, means fixed to the arm to support the element and allow it to move freely in a fixed path relative thereto, the floating element having spaced gaging surfaces adjacent the gaging surface of the arm, and jaws carried by the floating element to grip the part and cause movement of the element and its gaging surfaces relative to the arm and its gaging surface, the relative positions of the gaging surfaces indicating whether or not the centerline of the part is within predetermined limits of a given position relative to the centerline of the article.

2. A gage for checking the centerline of an elongate part with respect to the centerline of a cylindrical article upon the periphery of which the part is mounted, the gage comprising an arm, means to support the arm for movement in a guided path parallel with the centerline of the article, a floating element, means fixed to the arm to support the element and allow it to move freely in a fixed path at an angle with respect to the centerline of the article, the floating element having a gaging surface, jaws carried by the floating element to grip the part and cause movement of the element and its gaging surface relative to the arm, and a gaging element carried by the arm and having spaced gaging surfaces cooperating with the gaging surface of the floating element to indicate whether or not the centerline of the part at the portion being gaged is within predetermined limits of a given position relative to the centerline of the article.

3. A gage for checking the centerline of an elongate part with respect to the centerline of a cylindrical article upon the periphery of which the part is mounted, the gage comprising an arm, means to support the arm for movement in a guided path parallel with the centerline of the article, the arm having a fixed position gaging surface, a floating element, means fixed to the arm to support the element and allow it to move freely in a fixed path relative thereto, the floating element having spaced gaging surfaces adjacent the gaging surface of the arm, and jaws carried by the floating element and movable relative to each other to grip the part at an initial and at subsequent spaced portions thereof to centrally locate the floating element relative to the centerline of the part at the said portions, the relative positions of the gaging surfaces indicating whether or not the centerline of the part is within predetermined limits of a given position relative to the centerline of the article.

4. A gage for checking the centerline of an elongate part with respect to the centerline of a cylindrical article upon the periphery of which the part is mounted, the gage comprising an arm, means to support the arm for movement in a guided path parallel with the centerline of the article, the arm having a fixed position gaging surface, a floating element, means fixed to the arm to support the element and allow it to move freely in a fixed path relative thereto, the floating element having spaced gaging surfaces adjacent the gaging surface of the arm, jaws carried by the floating element and movable relative to each other to grip the part at an initial and at subsequent spaced portions thereof to centrally locate the floating element relative to the centerline of the part at the said portions, the relative positions of the gaging surfaces indicating whether or not the centerline of the part is within predetermined limits of a given position relative to the centerline of the article, a gaging element carried by the arm and having gaging surfaces, and means to actuate the gaging element to position the gaging surfaces relative to the floating element at the said initial portion to indicate whether or not the centerline of the part at the said subsequent portions is within given limits of the centerline of the initial portion of the part.

5. A gage for checking the centerline of an elongate part with respect to the centerline of a cylindrical article upon the periphery of which the part is mounted, the gage comprising an arm, means to support the arm for movement in a guided path parallel with the centerline of the article, the arm having a fixed position gaging surface, a floating element, means fixed to the arm to support the element and allow it to move freely in a fixed path relative thereto, the floating element having spaced gaging surfaces adjacent the gaging surface of the arm, jaws carried by the floating element and movable relative to each other to grip the part at an initial and at subsequent spaced portions thereof to centrally locate the floating element relative to the centerline of the part at the said portions, the relative positions of the gaging surfaces indicating whether or not the centerline of the part is within predetermined limits of a given position relative to the centerline of the article, a gaging element carried by the arm and having outer and an intermediate gaging surfaces, means to move the gaging element to position the intermediate gaging surface in registration with a surface of the floating element at the said initial portion to indicate whether or not the centerline of the part at the said subsequent portions is within given limits of the centerline of the initial portion of the part.

EARL C. MOSS.

No references cited.